(12) United States Patent
Wu

(10) Patent No.: US 9,854,449 B2
(45) Date of Patent: Dec. 26, 2017

(54) WIRELESS COMMUNICATION METHOD, ACCESS POINT, AND STATION

(71) Applicant: Huawei Technologies Co., Ltd., Shenzhen (CN)

(72) Inventor: Tianyu Wu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 15/214,116

(22) Filed: Jul. 19, 2016

(65) Prior Publication Data

US 2016/0330631 A1  Nov. 10, 2016

Related U.S. Application Data

(63) Continuation of application No. PCT/CN2014/071577, filed on Jan. 27, 2014.

(51) Int. Cl.
| | |
|---|---|
| *H04W 16/14* | (2009.01) |
| *H04W 74/08* | (2009.01) |
| *H04W 74/04* | (2009.01) |
| *H04W 16/00* | (2009.01) |
| *H04W 24/02* | (2009.01) |
| *H04W 88/08* | (2009.01) |

(52) U.S. Cl.
CPC ........... *H04W 16/14* (2013.01); *H04W 16/00* (2013.01); *H04W 24/02* (2013.01); *H04W 74/04* (2013.01); *H04W 74/08* (2013.01); *H04W 88/08* (2013.01)

(58) Field of Classification Search
CPC ........... H04W 72/042; H04W 74/0833; H04W 16/14; H04W 74/08; H04W 84/12; H04W 88/08; H04W 72/0406; H04W 72/0413; H04W 72/0453; H04W 74/0808; H04W 74/04
See application file for complete search history.

(56) References Cited

U.S. PATENT DOCUMENTS

| | | | |
|---|---|---|---|
| 6,078,568 A * | 6/2000 | Wright | .......... H04L 47/824 370/312 |
| 2016/0128097 A1* | 5/2016 | Pajukoski | ............ H04L 5/0055 370/336 |
| 2016/0277166 A1 | 9/2016 | Liu | |

(Continued)

FOREIGN PATENT DOCUMENTS

| | | |
|---|---|---|
| CN | 1882932 A | 12/2006 |
| CN | 101394225 A | 3/2009 |

(Continued)

*Primary Examiner* — Nam Huynh
(74) *Attorney, Agent, or Firm* — Slater Matsil, LLP

(57) ABSTRACT

A method includes determining, by a first access point, a working mode of a second access point, where a coverage area of the first access point overlaps a coverage area of the second access point, and where the working mode includes a non-coordinated scheduling mode, a coordinated scheduling mode, a contention mode, or an in-slot contention ISC mode. The method further includes initiating, by the first access point, a working mode switching procedure when it is determined that the working mode of the second access point is the non-coordinated scheduling mode, where the working mode switching procedure is used to switch the working mode of the second access point to the contention mode or the ISC mode.

20 Claims, 4 Drawing Sheets

(56) References Cited

U.S. PATENT DOCUMENTS

| | | |
|---|---|---|
| 2016/0323776 A1 | 11/2016 | Wu |
| 2016/0330631 A1 | 11/2016 | Wu |
| 2016/0338085 A1 | 11/2016 | Wu |
| 2016/0338105 A1 | 11/2016 | Wu et al. |

FOREIGN PATENT DOCUMENTS

| | | |
|---|---|---|
| CN | 102014393 A | 4/2011 |
| CN | 102098091 A | 6/2011 |
| WO | 2005119478 A1 | 12/2005 |

* cited by examiner

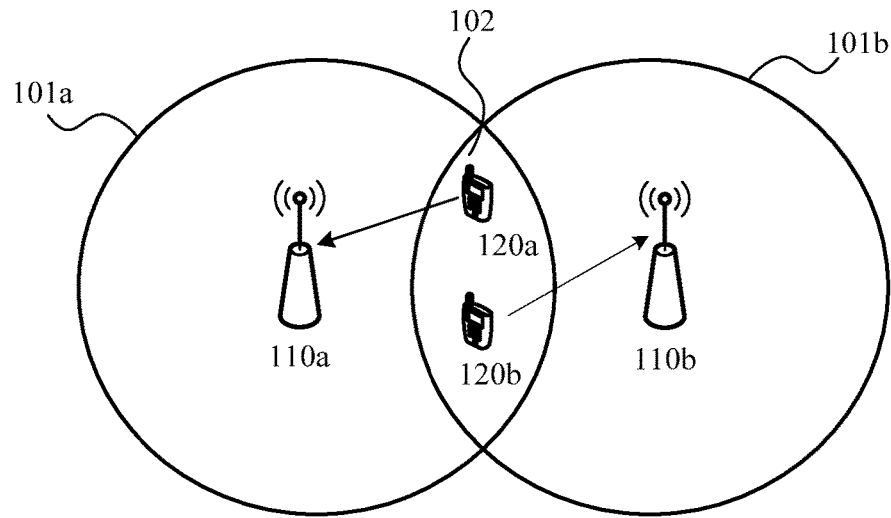

A first access point determines a working mode of a second access point, where a coverage area of the first access point overlaps a coverage area of the second access point, and the working mode includes one of a non-coordinated scheduling mode, a coordinated scheduling mode, a contention mode, and an in-slot contention ISC mode   ~210

When it is determined that the working mode of the second access point is the non-coordinated scheduling mode, the first access point initiates a working mode switching procedure, where the working mode switching procedure is used to switch the working mode of the second access point to the contention mode or the ISC mode   ~220

A first station that accesses a first access point senses an information frame sent by a second access point and/or a second station that accesses the second access point ⏤ 310

The first station determines a working mode of the second access point according to the information frame, where the working mode includes one of a non-coordinated scheduling mode, a coordinated scheduling mode, a contention mode, and an in-slot contention ISC mode ⏤ 320

When it is determined that the working mode of the second access point is the non-coordinated scheduling mode, the first station initiates a working mode switching procedure, where the working mode switching procedure is used to switch the working mode of the second access point to the contention mode or the ISC mode ⏤ 330

FIG. 3

Access point 40

Determining unit 410

Switching unit 420

FIG. 4

WIRELESS COMMUNICATION METHOD, ACCESS POINT, AND STATION

CROSS-REFERENCE TO RELATED APPLICATIONS

This application is a continuation of International Patent Application No. PCT/CN2014/071577, filed on Jan. 27, 2014, which is hereby incorporated by reference in its entirety.

TECHNICAL FIELD

The present disclosure relates to the wireless communication field, and in particular embodiments, to a wireless communication method, an access point, and a station.

BACKGROUND

As a WLAN (Wireless Local Area Network) system works on an unlicensed spectrum, other users on a channel may share the spectrum. If multiple users send data simultaneously, mutual interference may occur and collision is caused. Currently, the WLAN system uses a CSMA/CA (Carrier Sense Multiple Access with Collision Avoidance) mode to avoid collision. However, the CDMA/CA working mode is relatively inefficient. Especially, in a circumstance in which APs (Access Point) and STAs (Station) are deployed densely, a probability of collision from channel contention increases significantly, and MAC (Media Access Control) efficiency decreases significantly.

In an LTE (Long Term Evolution) system, to ensure high MAC efficiency, a scheduling-based transmission mode is used. In the scheduling-based transmission mode, user equipment does not need to acquire a transmit opportunity by means of channel contention, and a base station allocates time-frequency resources and performs scheduling for each user equipment to perform uplink and downlink transmission. Currently, the scheduling mode is used only on a licensed spectrum. Because there is no collision from channel contention, this mechanism can implement MAC efficiency of about 80%.

If the scheduling mode is introduced into a communications system that uses an unlicensed spectrum, some problems may be caused. For example, if the scheduling mode is introduced into a WLAN system, when two APs with an overlapping coverage area use the scheduling mode, work on a same channel, and cannot perform coordinated transmission, mutual interference may occur between the two APs and neither can work normally.

SUMMARY

The present disclosure provides a wireless communication method, an access point, and a station, which can reduce mutual interference between non-coordinated access points with an overlapping coverage area, and further ensure that each access point can work normally.

According to a first aspect, the present disclosure provides a wireless communication method, including: determining, by a first access point, a working mode of a second access point, where a coverage area of the first access point overlaps a coverage area of the second access point, and the working mode includes one of a non-coordinated scheduling mode, a coordinated scheduling mode, a contention mode, and an in-slot contention ISC mode; and when it is determined that the working mode of the second access point is the non-coordinated scheduling mode, initiating, by the first access point, a working mode switching procedure, where the working mode switching procedure is used to switch the working mode of the second access point to the contention mode or the ISC mode.

In an implementation of the first aspect, the determining, by a first access point, a working mode of a second access point includes: determining, by the first access point, the working mode of the second access point according to working mode information received from the second access point, where the working mode information includes an identity and a working mode identifier that are of the second access point.

In an implementation of the first aspect, the determining, by a first access point, a working mode of a second access point includes: determining, by the first access point, the working mode of the second access point according to sense information received from a station that accesses the first access point, where the sense information is determined according to a sensed information frame by the station that accesses the first access point, the information frame is sent by the second access point or a station that accesses the second access point, and the information frame includes a working mode identifier of the second access point.

In an implementation of the first aspect, the determining, by a first access point, a working mode of a second access point includes: when a quantity of stations that access the first access point is less than a first threshold, determining, by the first access point, a packet loss rate of sending a packet in a preset time period; and when the packet loss rate is greater than a second threshold, determining, by the first access point, that the working mode of the second access point is the non-coordinated scheduling mode.

In an implementation of the first aspect, the determining, by a first access point, a working mode of a second access point includes: when a quantity of stations that access the first access point is greater than a third threshold, determining, by the first access point, a packet loss rate of sending, in a preset time period, a packet to each station that accesses the first access point; and when a quantity of stations whose packet loss rate is greater than a fourth threshold is greater than a fifth threshold, determining, by the first access point, that the working mode of the second access point is the non-coordinated scheduling mode.

In an implementation of the first aspect, the determining, by a first access point, a working mode of a second access point includes: when a quantity of times for which a station scheduled by the first access point or the first access point cannot send data in a preset time period is greater than a sixth threshold, or when a ratio of the quantity of times to a total quantity of times of sending data is greater than a seventh threshold, determining, by the first access point, that the working mode of the second access point is the non-coordinated scheduling mode.

In an implementation of the first aspect, the determining, by a first access point, a working mode of a second access point includes: when a working mode of the first access point is the contention mode or the ISC mode and a contention success rate of the first access point or a station that accesses the first access point is lower than an eighth threshold, determining, by the first access point, that the working mode of the second access point is the non-coordinated scheduling mode.

In an implementation of the first aspect, the determining, by a first access point, a working mode of a second access point includes: when the first access point senses in a preset time period that a quantity of times for which a packet sent by the second access point or a station that accesses the second access point is a packet sent in the contention mode is greater than a ninth threshold, determining, by the first access point, that the working mode of the second access point is the contention mode.

In an implementation of the first aspect, the initiating, by the first access point, a working mode switching procedure includes: broadcasting, by the first access point, an ISC mode switching frame, where the ISC mode switching frame is used to instruct the second access point to switch to the ISC mode.

In an implementation of the first aspect, before the broadcasting, by the first access point, an ISC mode switching frame, the method further includes: broadcasting, by the first access point, an ISC mode request frame, where the ISC mode request frame is used to determine whether the second access point supports the ISC mode; and when the first access point receives a response frame that is sent, in response to the ISC mode request frame, by the second access point and/or the station that accesses the second access point, determining that the second access point supports the ISC mode; and the broadcasting, by the first access point, an ISC mode switching frame includes: when it is determined that the second access point supports the ISC mode, broadcasting, by the first access point, the ISC mode switching frame.

In an implementation of the first aspect, the initiating, by the first access point, a working mode switching procedure includes: when the working mode of the first access point is the contention mode, broadcasting, by the first access point, a contention mode switching frame, where the contention mode switching frame is used to instruct the second access point to switch to the contention mode.

In an implementation of the first aspect, the method further includes: when the working mode of the second access point is the contention mode and the working mode of the first access point is the non-coordinated scheduling mode or the ISC mode, switching, by the first access point, to the contention mode.

In an implementation of the first aspect, after the initiating, by the first access point, a working mode switching procedure, the method further includes: when the first access point determines that there is no second access point whose coverage area overlaps the coverage area of the first access point and that works in the non-coordinated scheduling mode, broadcasting, by the first access point, a coordinated scheduling mode switching frame, so that an access point that receives the coordinated scheduling mode switching frame switches to the coordinated scheduling mode.

In an implementation of the first aspect, before the broadcasting, by the first access point, a coordinated scheduling mode switching frame, the method further includes: broadcasting, by the first access point, a mode probe frame, where the mode probe frame is used to determine whether there is an access point that works in the non-coordinated scheduling mode; and when no response frame in response to the mode probe frame is received in a preset time period, determining, by the first access point, that there is no access point that works in the non-coordinated scheduling mode; and the broadcasting, by the first access point, a coordinated scheduling mode switching frame includes: when it is determined that there is no access point that works in the non-coordinated scheduling mode, broadcasting, by the first access point, the coordinated scheduling mode switching frame.

According to a second aspect, a wireless communication method is provided, including: sensing, by a first station that accesses a first access point, an information frame sent by a second access point and/or a second station that accesses the second access point; determining, by the first station, a working mode of the second access point according to the information frame, where the working mode includes one of a non-coordinated scheduling mode, a coordinated scheduling mode, a contention mode, and an in-slot contention ISC mode; and when it is determined that the working mode of the second access point is the non-coordinated scheduling mode, initiating, by the first station, a working mode switching procedure, where the working mode switching procedure is used to switch the working mode of the second access point to the contention mode or the ISC mode.

In an implementation of the second aspect, the initiating, by the first station, a working mode switching procedure includes: broadcasting, by the first station, an ISC mode switching frame, where the ISC mode switching frame is used to instruct the second access point to switch to the ISC mode.

In an implementation of the second aspect, the initiating, by the first station, a working mode switching procedure includes: broadcasting, by the first station, a contention mode switching frame, where the contention mode switching frame is used to instruct the second access point to switch to the contention mode.

According to a third aspect, an access point is provided, including: a determining unit, configured to determine a working mode of a second access point, where a coverage area of the access point overlaps a coverage area of the second access point, and the working mode includes one of a non-coordinated scheduling mode, a coordinated scheduling mode, a contention mode, and an in-slot contention ISC mode; and a switching unit, configured to: when it is determined that the working mode of the second access point is the non-coordinated scheduling mode, initiate a working mode switching procedure, where the working mode switching procedure is used to switch the working mode of the second access point to the contention mode or the ISC mode.

In an implementation of the third aspect, the determining unit is configured to determine the working mode of the second access point according to working mode information received from the second access point, where the working mode information includes an identity and a working mode identifier that are of the second access point.

In an implementation of the third aspect, the determining unit is configured to determine the working mode of the second access point according to sense information received from a station that accesses the access point, where the sense information is determined according to a sensed information frame by the station that accesses the access point, the information frame is sent by the second access point or a station that accesses the second access point, and the information frame includes a working mode identifier of the second access point.

In an implementation of the third aspect, the determining unit is configured to: when a quantity of stations that access the access point is less than a first threshold, determine a packet loss rate of sending a packet in a preset time period; and when the packet loss rate is greater than a second threshold, determine that the working mode of the second access point is the non-coordinated scheduling mode.

In an implementation of the third aspect, the determining unit is configured to: when a quantity of stations that access the access point is greater than a third threshold, determine a packet loss rate of sending, in a preset time period, a packet to each station that accesses the access point; and when a quantity of stations whose packet loss rate is greater than a fourth threshold is greater than a fifth threshold, determine that the working mode of the second access point is the non-coordinated scheduling mode.

In an implementation of the third aspect, the determining unit is configured to: when a quantity of times for which a station scheduled by the access point or the access point cannot send data in a preset time period is greater than a sixth threshold, or when a ratio of the quantity of times to a total quantity of times of sending data is greater than a seventh threshold, determine that the working mode of the second access point is the non-coordinated scheduling mode.

In an implementation of the third aspect, the determining unit is configured to: when a working mode of the access point is the contention mode or the ISC mode and a contention success rate of the access point or a station that accesses the access point is lower than an eighth threshold, determine that the working mode of the second access point is the non-coordinated scheduling mode.

In an implementation of the third aspect, the determining unit is configured to: when it is sensed in a preset time period that a quantity of times for which a packet sent by the second access point or a station that accesses the second access point is a packet sent in the contention mode is greater than a ninth threshold, determine that the working mode of the second access point is the contention mode.

In an implementation of the third aspect, the switching unit is configured to broadcast an ISC mode switching frame, where the ISC mode switching frame is used to instruct the second access point to switch to the ISC mode.

In an implementation of the third aspect, the determining unit is further configured to: broadcast an ISC mode request frame, where the ISC mode request frame is used to determine whether the second access point supports the ISC mode; and when a response frame that is sent, in response to the ISC mode request frame, by the second access point and/or the station that accesses the second access point is received, determine that the second access point supports the ISC mode; and the switching unit is configured to: when it is determined that the second access point supports the ISC mode, broadcast the ISC mode switching frame.

In an implementation of the third aspect, the switching unit is configured to: when the working mode of the access point is the contention mode, broadcast a contention mode switching frame, where the contention mode switching frame is used to instruct the second access point to switch to the contention mode.

In an implementation of the third aspect, the switching unit is further configured to: when the working mode of the second access point is the contention mode and the working mode of the access point is the non-coordinated scheduling mode or the ISC mode, switch the access point to the contention mode.

In an implementation of the third aspect, the switching unit is further configured to: when the access point determines that there is no second access point whose coverage area overlaps the coverage area of the access point and that works in the non-coordinated scheduling mode, broadcast a coordinated scheduling mode switching frame, so that an access point that receives the coordinated scheduling mode switching frame switches to the coordinated scheduling mode.

In an implementation of the third aspect, the determining unit is further configured to: broadcast a mode probe frame, where the mode probe frame is used to determine whether there is an access point that works in the non-coordinated scheduling mode; and when no response frame in response to the mode probe frame is received in a preset time period, determine that there is no access point that works in the non-coordinated scheduling mode; and the switching unit is configured to: when it is determined that there is no access point that works in the non-coordinated scheduling mode, broadcast the coordinated scheduling mode switching frame.

According to a fourth aspect, a station is provided, where the station accesses a first access point and includes: a sensing unit, configured to sense an information frame sent by a second access point and/or a second station that accesses the second access point; a determining unit, configured to determine a working mode of the second access point according to the information frame, where the working mode includes one of a non-coordinated scheduling mode, a coordinated scheduling mode, a contention mode, and an in-slot contention ISC mode; and a switching unit, configured to: when it is determined that the working mode of the second access point is the non-coordinated scheduling mode, initiate a working mode switching procedure, where the working mode switching procedure is used to switch the working mode of the second access point to the contention mode or the ISC mode.

In an implementation of the fourth aspect, the switching unit is configured to broadcast an ISC mode switching frame, where the ISC mode switching frame is used to instruct the second access point to switch to the ISC mode.

In an implementation of the fourth aspect, the switching unit is configured to broadcast a contention mode switching frame, where the contention mode switching frame is used to instruct the second access point to switch to the contention mode.

Based on the foregoing technical solutions, an access point of the present disclosure can detect a working mode of a neighboring access point whose coverage area overlaps a coverage area of the access point; when the working mode of the neighboring access point is a non-coordinated scheduling mode, a working mode switching procedure is initiated. In this way, mutual interference between non-coordinated access points with an overlapping coverage area can be reduced, which further ensures that each access point can work normally.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic structural diagram of a communications system to which a wireless communication method and an access point according to an embodiment of the present invention are applicable;

FIG. 2 is a schematic flowchart of a wireless communication method according to an embodiment of the present invention;

FIG. 3 is a schematic flowchart of a wireless communication method according to another embodiment of the present invention;

FIG. 4 is a schematic block diagram of an access point according to an embodiment of the present invention;

DETAILED DESCRIPTION OF ILLUSTRATIVE EMBODIMENTS

Figure 5:
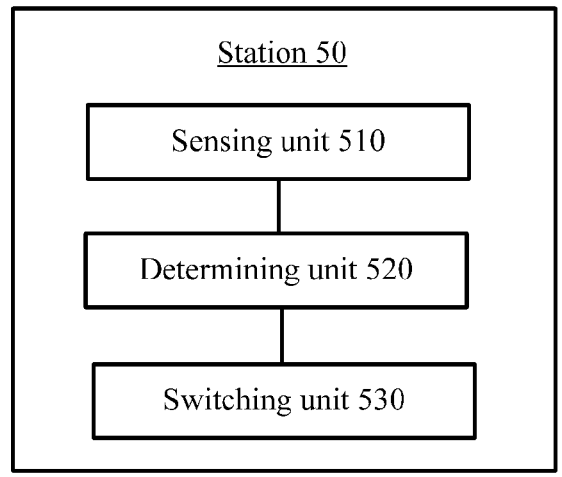
FIG. 5 is a schematic block diagram of a station according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present disclosure.

It should be understood that the technical solutions of the embodiments of the present invention may be applied to a communications system, such as a WLAN system, that uses an unlicensed spectrum resource.

It should also be understood that in the embodiments of the present invention, an access point is a network device, such as an AP in a WLAN system, that provides an access service; a station is another device that accesses the access point through a wireless network to perform communication, for example, user equipment ("UE" for short) that may be called a terminal, a mobile station ("MS" for short), a mobile terminal, and the like, which is not limited in the present disclosure. However, for ease of description, the following embodiments use an access point AP and a station STA as examples for description.

FIG. 1 is a schematic structural diagram of a communications system to which a wireless communication method and an access point according to an embodiment of the present invention are applicable. The communications system in FIG. 1 is described by using a first AP 110*a* whose coverage area is 101*a* and a second AP 110*b* whose coverage area is 101*b* as examples. However, a quantity of APs 110 is not limited in this embodiment of the present invention. A first STA 120*a* accesses the first AP 110*a*, a second STA 120*b* accesses the second AP 110*b*, and the first STA 120*a* and the second STA 120*b* are located in a coverage area 102 overlapped by 101*a* and 101*b*.

For example, both the first AP 110*a* and the second AP 110*b* work in a scheduling mode, and perform scheduling, by delivering scheduling information, for a station and/or an access point to transmit data, but cannot perform coordinated scheduling. It is assumed that a transmission resource used for communication between the first AP 110*a* and the first STA 120*a* is a first channel, and a transmission resource used for communication between the second AP 110*b* and the second STA 120*b* is a second channel. When the first channel and the second channel are identical or have a similar frequency, strong mutual interference is caused, and frequent communication errors may occur on both the first AP 110*a* and the second AP 110*b*. Therefore, both the first AP and the second AP cannot work normally.

For another example, the first AP 110*a* works in a contention mode, such as a CDMA/CA mode or a contention mode that uses the RTS/CTS (Request to Send/Clear to Send) protocol to perform transmission protection. The second AP 110*b* works in a scheduling mode, and performs scheduling, by delivering scheduling information, for a station and/or an access point to transmit data. In this way, when communication traffic is busy, channel contention success rates of the first AP and the first STA decrease significantly. As a result, the first AP cannot work normally.

An embodiment of the present invention provides a wireless communication method that can avoid mutual interference between non-coordinated access points, which further ensures that each access point can work normally.

FIG. 2 is a schematic flowchart of a wireless communication method according to an embodiment of the present invention. For example, the method may be performed by an access point 110*a* or an access point 110*b* shown in FIG. 1.

210. A first access point determines a working mode of a second access point, where a coverage area of the first access point overlaps a coverage area of the second access point, and the working mode includes one of a non-coordinated scheduling mode, a coordinated scheduling mode, a contention mode, and an in-slot contention ISC mode.

220. When it is determined that the working mode of the second access point is the non-coordinated scheduling mode, the first access point initiates a working mode switching procedure, where the working mode switching procedure is used to switch the working mode of the second access point to the contention mode or the ISC mode.

In this embodiment of the present invention, an access point can detect a working mode of a neighboring access point whose coverage area overlaps a coverage area of the access point; when the working mode of the neighboring access point is a non-coordinated scheduling mode, a working mode switching procedure is initiated. In this way, mutual interference between non-coordinated access points with an overlapping coverage area can be reduced, which further ensures that each access point can work normally.

It should be understood that the non-coordinated scheduling mode indicates that the second access point works in a scheduling mode and cannot work collaboratively with a current working mode of the first access point. The access point may uniformly allocate and schedule channel resources to implement the scheduling mode. For example, when the first access point works in the contention mode or the ISC mode, it is determined that the working mode of the second access point is the non-coordinated scheduling mode regardless of a scheduling mode in which the second access point works; when the first access point works in a scheduling mode and the second access point also works in a scheduling mode, the working mode of the second access point is determined as the non-coordinated scheduling mode only in a case in which the second access point cannot work collaboratively with the first access point.

The coordinated scheduling mode indicates that the second access point works in the scheduling mode and can work collaboratively with the current working mode of the first access point. For example, both the second access point and the first access point work in the scheduling mode and can work collaboratively with each other, and in this case, the first access point can determine that the second access point works in the coordinated scheduling mode.

The contention mode indicates that the second access point and a station that accesses the second access point acquire a transmit opportunity in a contention manner, such as a CDMA/CA mode or a contention mode that uses the RTS/CTS (Request to Send/Clear to Send) protocol to perform transmission protection.

The ISC (in-slot contention) mode is a mode that combines scheduling and contention. First, the second access point performs pre-scheduling on data transmission, and then a device scheduled for data transmission performs channel contention according to scheduling information. When the channel contention succeeds, the scheduling information takes effect; when the channel contention fails, the scheduling information is invalid.

For example, in the ISC mode, a device scheduled for receiving data performs the following actions: acquiring scheduling information from an access point; and if the device is pre-scheduled by the access point according to the scheduling information to receive data in a first timeslot of a first channel, sending a contention frame before a start moment of a data transmission time corresponding to the first timeslot of the first channel, so as to contend for the first timeslot of the first channel. Optionally, before the contention frame is sent, random backoff may further be performed; or random backoff may be performed according to a service priority. In addition, if the data is not received in the first timeslot of the first channel, the access point may further be requested to perform re-scheduling.

For example, in the ISC mode, a device scheduled for sending data performs the following actions: acquiring scheduling information from an access point; receiving at least one contention frame; and if the device is pre-scheduled by the access point according to the scheduling information to send data in a first timeslot of a first channel, and a sending device of the first received contention frame belongs to a BSS (Basic Service Set) in which the access point is located, sending the data in the first timeslot of the first channel. If the sending device of the first received contention frame does not belong to the BSS in which the access point is located, the device keeps silent in a data transmission time of the first timeslot of the first channel, and may further request the access point to perform re-scheduling. It should be understood that, that the sending device of the first contention frame belongs to the BSS in which the access point is located indicates that the access point is a serving access point of the sending device, for example, the sending device is associated with the access point.

Alternatively, in the ISC mode, a device scheduled for sending data performs the following actions: acquiring scheduling information from an access point; receiving at least one contention frame; and if the device is pre-scheduled by the access point according to the scheduling information to send data in a first timeslot of a first channel, and a sending device of the at least one contention frame belongs to a BSS in which the access point is located, sending the data in the first timeslot of the first channel. If at least one sending device in the sending device of the at least one contention frame does not belong to the BSS in which the access point is located, the device keeps silent in a data transmission time of the first timeslot of the first channel, and may further request the access point to perform re-scheduling. It should be understood that, that the sending device of the contention frame belongs to the BSS in which the access point is located indicates that the access point is a serving access point of the sending device, for example, the sending device is associated with the access point.

Optionally, in an embodiment, in step 210, the first access point determines the working mode of the second access point according to working mode information received from the second access point, where the working mode information includes at least an identity and a working mode identifier that are of the second access point.

For example, in a case in which the APs have a working mode interaction capability, the first AP may determine a current working mode of the second AP according to the working mode information received from the second AP. The working mode information includes at least an identity of the AP and a current working mode identifier of the AP.

The identity of the AP may include one or more of the following: a MAC address of the AP, a BSSID (Basic Service Set Identifier) of the AP, and a network identifier of a network formed by a group of APs. The current working mode identifier of the AP represents a current working mode of the AP, and the first AP may also determine the working mode of the second AP with reference to the current working mode of the first AP. For example, with reference to the current working mode of the first AP and the working mode identifier of the second AP, the first AP determines that the current working mode of the second AP is the non-coordinated scheduling mode.

Optionally, the second AP may broadcast the working mode information on all working channels or a dedicated channel, or may perform sending by using a beacon frame to carry the working mode information. In a case in which the second AP works in a scheduling mode, a transmit channel may also be determined first in a scheduling manner, and then the working mode information may be sent to a surrounding AP or STA through the transmit channel.

Optionally, after receiving working mode information of another AP, the first AP may save the working mode information, and send response information. The response information may be an acknowledge ACK frame, or may be information that includes an identity and a current working mode identifier that are of the first AP. In this way, after receiving the response information, the another AP confirms that the first AP receives the working mode information; otherwise, the another AP confirms that the first AP does not receive the working mode information, and the working mode information needs to be sent again. Meanwhile, the first AP sends the working mode information to a STA that accesses the first AP. When the STA that accesses the first AP receives the working mode information sent by the another AP, but does not receive the working mode information sent by the first AP, the STA may determine that the first AP has not received the working mode information, and forwards the working mode information to the first AP.

Optionally, in another embodiment, in step 210, the first access point determines the working mode of the second access point according to sense information received from a station that accesses the first access point, where the sense information is determined according to a sensed information frame by the station that accesses the first access point, the information frame is sent by the second access point or a station that accesses the second access point, and the information frame includes at least a working mode identifier of the second access point.

For example, when sensing the information frame sent by the second AP, the STA sends the information frame or sense information determined according to the information frame to the first AP accessed by the STA. Alternatively, when sensing an information frame sent by another STA to the second AP, the STA sends the information frame or sense information determined according to the information frame to the first AP accessed by the STA. In this way, the first AP determines the working mode of the second AP according to the information frame or the sense information.

Optionally, in another embodiment, in step 210, when a quantity of stations that access the first access point is less than a first threshold, the first access point may determine a packet loss rate of sending a packet in a preset time period. When the packet loss rate is greater than a second threshold, the first access point determines that the working mode of the second access point is the non-coordinated scheduling mode.

For example, in a case in which there is an AP whose coverage area overlaps the coverage area of the first AP and that is around the first AP and works in the non-coordinated scheduling mode, a communication error may occur frequently on the first AP. Therefore, the first AP may preset the packet loss rate of sending the packet to a STA in the preset time period. When the packet loss rate exceeds the threshold, the first AP determines that there is at least one second AP that is around the first AP and whose working mode is the non-coordinated scheduling mode.

Optionally, in another embodiment, in step 210, when a quantity of stations that access the first access point is greater than a third threshold, the first access point may determine a packet loss rate of sending, in a preset time period, a packet to each station that accesses the first access point. When a quantity of stations whose packet loss rate is greater than a fourth threshold is greater than a fifth threshold, the first access point determines that the working mode of the second access point is the non-coordinated scheduling mode.

For example, in a case in which there is an AP whose coverage area overlaps the coverage area of the first AP and that is around the first AP and works in the non-coordinated scheduling mode, a communication error may occur frequently on the first AP. Therefore, the first AP may determine the packet loss rate of sending the packet to each STA in the preset time period. When the quantity of stations whose packet loss rate is greater than the fourth threshold is greater than the fifth threshold, the first AP determines that there is at least one second AP that is around the first AP and whose working mode is the non-coordinated scheduling mode.

Optionally, in another embodiment, in step 210, when a quantity of times for which a station scheduled by the first access point or the first access point cannot send data in a preset time period is greater than a sixth threshold, or when a ratio of the quantity of times to a total quantity of times of sending data is greater than a seventh threshold, the first access point determines that the working mode of the second access point is the non-coordinated scheduling mode.

For example, the first AP works in a scheduling mode, and in this scheduling mode, a scheduled STA and/or AP sense a channel before sending data, sends the data when the channel is idle, and does not send the data when the channel is not idle. In this case, the first AP may determine a quantity of times for which the scheduled STA and/or AP cannot send the data in the preset time period. When the quantity of times is greater than the preset sixth threshold, it is determined that there is at least one second AP that is around the first AP and whose working mode is the non-coordinated mode. Alternatively, when a ratio of the quantity of times to a total quantity of times of sending the data is greater than the seventh threshold, it is determined that there is at least one second AP that is around the first AP and whose working mode is the non-coordinated scheduling mode.

Optionally, in another embodiment, in step 210, when a working mode of the first access point is the contention mode or the ISC mode and a contention success rate of the first access point or a station that accesses the first access point is lower than an eighth threshold, the first access point determines that the working mode of the second access point is the non-coordinated scheduling mode.

For example, when the first AP works in the contention mode, a contention success rate of the first AP and/or the STA that accesses the first AP is preset. When the contention success rate is lower than the eighth threshold, the first AP determines that there is at least one second AP that is around the first AP and whose working mode is the non-coordinated scheduling mode. Likewise, when the first AP works in the ISC mode, a contention success rate, in a contention period, of the first AP and/or the STA that accesses the first AP may also be preset. When the contention success rate is lower than the eighth threshold, the first AP determines that there is at least one second AP that is around the first AP and whose working mode is the non-coordinated scheduling mode.

Optionally, in another embodiment, in step 210, when the first access point senses in a preset time period that a quantity of times for which a packet sent by the second access point or a station that accesses the second access point is a packet sent in the contention mode is greater than a ninth threshold, the first access point determines that the working mode of the second access point is the contention mode.

For example, the first AP or the STA that accesses the first AP can sense a packet received or sent by the second access point, and therefore, can determine, according to the packet, whether the packet is a packet sent in the contention mode. The packet may be a channel contention frame, an unidentifiable frame, or a frame of which neither source address nor destination address belongs to the first AP. Therefore, the first AP may determine the quantity of times for which the packet sent by the second AP and/or the STA that accesses the second AP is, in the preset time period, the packet sent in the contention mode. When the quantity of times is greater than the ninth threshold, the first AP determines that the working mode of the second access point is the contention mode.

Optionally, in another embodiment, in step 220, when the working mode of the second access point is the non-coordinated scheduling mode, the first access point broadcasts an ISC mode switching frame, where the ISC mode switching frame is used to instruct the second access point to switch to the ISC mode. In this way, interference caused by the second access point to the first access point can be reduced, and the second access point has relatively high MAC efficiency.

It should be understood that at the same time when the second access point is instructed to switch to the ISC mode, the first access point may also switch to the ISC mode. In this way, both the first access point and the second access point work in the ISC mode without mutual interference, and both have relatively high MAC efficiency.

For example, when the first AP determines that the working mode of the second AP is the non-coordinated scheduling mode, or when the first AP determines that there is at least one second AP that is around the first AP and whose working mode is the non-coordinated scheduling mode, the first AP broadcasts the ISC mode switching frame. In this way, the second AP and the STA that accesses the second AP switch to the ISC mode. Meanwhile, the first AP may also switch to the ISC mode. It should be understood that a technical solution in which the first AP switches to the ISC mode at the same time also falls within the protection scope of this embodiment of the present invention.

Optionally, before the first access point broadcasts the ISC mode switching frame, the first access point may further broadcast an ISC mode request frame, where the ISC mode request frame is used to determine whether the second access point supports the ISC mode. When the first access point receives a response frame that is sent, in response to the ISC mode request frame, by the second access point and/or the station that accesses the second access point, it is determined that the second access point supports the ISC mode. In this case, the first access point broadcasts the ISC mode switching frame when it is determined that the second access point supports the ISC mode. In this way, performance of mode switching can be improved.

The following uses an example in which the first AP works in a scheduling mode for description. The first AP sends the ISC mode request frame in a downlink timeslot. If the second AP supports the ISC mode, the second AP sends a response frame to the first AP after receiving the ISC mode request frame. The first AP broadcasts the ISC mode switching frame after receiving the response frame.

For example, in a procedure in which the AP switches from the scheduling mode to the ISC mode, a location of sending the ISC mode request frame is not generated by means of scheduling, but is preset. For example, the ISC mode request frame may be sent at an ending location of a timeslot. When the AP works in the scheduling mode, an interval needs to be reserved between timeslots for a purpose of channel detection or for sending a CTS-to-self (Clear to Send to Self) frame. The ISC mode request frame may be sent at the beginning of the interval. A sending manner of the ISC mode request frame may be that the AP broadcasts the frame on all channels. The ISC mode request frame includes an identity of the first AP, such as a MAC address. In this way, after receiving the ISC mode request frame, the second AP may send a response frame to the first AP according to the identity of the first AP. The location of sending the response frame is also preset, for example, may be the ending location of the timeslot. A method used by the AP to instruct all STAs in the coverage area to switch to the ISC mode may be adding indication information into a beacon frame or broadcasting ISC working mode switching control information on a specific control channel.

Optionally, in another embodiment, in step 220, when the working mode of the second access point is the non-coordinated scheduling mode, and the working mode of the first access point is the contention mode, the first access point broadcasts a contention mode switching frame, where the contention mode switching frame is used to instruct the second access point to switch to the contention mode.

In this way, both the first AP and the second AP work in the contention mode, such as a CSMA/CA mode or a contention mode that uses the RTS/CTS protocol to perform transmission protection, which further ensures that both the first AP and the second AP can work normally.

Optionally, in another embodiment, in step 220, when the working mode of the second access point is the contention mode and the working mode of the first access point is the non-coordinated scheduling mode or the ISC mode, the first access point switches to the contention mode.

Optionally, in another embodiment, after the first access point initiates the working mode switching procedure, when the first access point determines that there is no second access point whose coverage area overlaps the coverage area of the first access point and that works in the non-coordinated scheduling mode, the first access point may broadcast a coordinated scheduling mode switching frame, so that an access point that receives the coordinated scheduling mode switching frame switches to the coordinated scheduling mode.

In this way, when there is no second access point that is around the first access point and that works in the non-coordinated scheduling mode, the first access point and the access point that receives the coordinated scheduling mode switching frame may be restored to the coordinated scheduling mode and work in the scheduling mode, which further improves MAC efficiency.

Optionally, in another embodiment, before the first access point broadcasts the coordinated scheduling mode switching frame, the first access point may broadcast a mode probe frame, where the mode probe frame is used to determine whether there is an access point that works in the non-coordinated scheduling mode. When no response frame in response to the mode probe frame is received in a preset time period, determining, by the first access point, that there is no access point that works in the non-coordinated scheduling mode. In this case, the first access point broadcasts the coordinated scheduling mode switching frame when it is determined that there is no access point that works in the non-coordinated scheduling mode.

In this way, when it is determined that there is no access point that is around the first access point and that works in the non-coordinated scheduling mode, the first access point switches to the coordinated scheduling mode, which can prevent misoperation, thereby improving switching efficiency. The first access point and the access point that receives the coordinated scheduling mode switching frame switch to the coordinated scheduling mode and work in the scheduling mode, which further improves the MAC efficiency.

FIG. 3 is a schematic flowchart of a wireless communication method according to another embodiment of the present invention. For example, the method may be performed by a station 120a or a station 120b shown in FIG. 1.

310. A first station that accesses a first access point senses an information frame sent by a second access point and/or a second station that accesses the second access point.

320. The first station determines a working mode of the second access point according to the information frame, where the working mode includes one of a non-coordinated scheduling mode, a coordinated scheduling mode, a contention mode, and an in-slot contention ISC mode.

330. When it is determined that the working mode of the second access point is the non-coordinated scheduling mode, the first station initiates a working mode switching procedure, where the working mode switching procedure is used to switch the working mode of the second access point to the contention mode or the ISC mode.

In this embodiment of the present invention, a station detects a working mode of a neighboring access point around the station; when the working mode of the neighboring access point is a non-coordinated scheduling mode, a working mode switching procedure is initiated. In this way, mutual interference between non-coordinated access points with an overlapping coverage area can be reduced, which further ensures that each access point can work normally.

It should be understood that the non-coordinated scheduling mode indicates that the second access point works in a scheduling mode and cannot work collaboratively with a current working mode of the first access point. The access point may uniformly allocate and schedule channel resources to implement the scheduling mode. For example, when the first access point works in the contention mode or the ISC mode, it is determined that the working mode of the second access point is the non-coordinated scheduling mode regardless of a scheduling mode in which the second access point works; when the first access point works in a scheduling mode and the second access point also works in a scheduling mode, the working mode of the second access point is determined as the non-coordinated scheduling mode only in a case in which the second access point cannot work collaboratively with the first access point.

The coordinated scheduling mode indicates that the second access point works in the scheduling mode and can work collaboratively with the current working mode of the first access point. For example, both the second access point and the first access point work in the scheduling mode and can work collaboratively with each other, and in this case, the first access point can determine that the second access point works in the coordinated scheduling mode.

The contention mode indicates that the second access point and a station that accesses the second access point acquire a transmit opportunity in a contention manner, such as a CDMA/CA mode or a contention mode that uses the RTS/CTS protocol to perform transmission protection.

The ISC mode is a mode that combines scheduling and contention. First, the second access point performs pre-scheduling on data transmission, and then a device scheduled for data transmission performs channel contention according to scheduling information. When the channel contention succeeds, the scheduling information takes effect; when the channel contention fails, the scheduling information is invalid.

For example, in the ISC mode, a device scheduled for receiving data performs the following actions: acquiring scheduling information from an access point; and if the device is pre-scheduled by the access point according to the scheduling information to receive data in a first timeslot of a first channel, sending a contention frame before a start moment of a data transmission time corresponding to the first timeslot of the first channel, so as to contend for the first timeslot of the first channel. Optionally, before the contention frame is sent, random backoff may further be performed; or random backoff may be performed according to a service priority. In addition, if the data is not received in the first timeslot of the first channel, the access point may further be requested to perform re-scheduling.

For example, in the ISC mode, a device scheduled for sending data performs the following actions: acquiring scheduling information from an access point; receiving at least one contention frame; and if the device is pre-scheduled by the access point according to the scheduling information to send data in a first timeslot of a first channel, and a sending device of the first received contention frame belongs to a BSS in which the access point is located, sending the data in the first timeslot of the first channel. If the sending device of the first received contention frame does not belong to the BSS in which the access point is located, the device keeps silent in a data transmission time of the first timeslot of the first channel, and may further request the access point to perform re-scheduling. It should be understood that, that the sending device of the first contention frame belongs to the BSS in which the access point is located indicates that the access point is a serving access point of the sending device, for example, the sending device is associated with the access point.

Alternatively, in the ISC mode, a device scheduled for sending data performs the following actions: acquiring scheduling information from an access point; receiving at least one contention frame; and if the device is pre-scheduled by the access point according to the scheduling information to send data in a first timeslot of a first channel, and a sending device of the at least one contention frame belongs to a BSS in which the access point is located, sending the data in the first timeslot of the first channel. If at least one sending device in the sending device of the at least one contention frame does not belong to the BSS in which the access point is located, the device keeps silent in a data transmission time of the first timeslot of the first channel, and may further request the access point to perform re-scheduling. It should be understood that, that the sending device of the contention frame belongs to the BSS in which the access point is located indicates that the access point is a serving access point of the sending device, for example, the sending device is associated with the access point.

Optionally, in an embodiment, in step 330, when the working mode of the second access point is the non-coordinated scheduling mode, the first station broadcasts an ISC mode switching frame, where the ISC mode switching frame is used to instruct the second access point to switch to the ISC mode.

In this way, interference caused by the second access point to the first access point can be reduced, and the second access point has relatively high MAC efficiency.

It should be understood that at the same time when the second access point is instructed to switch to the ISC mode, the first access point may also switch to the ISC mode. In this way, both the first access point and the second access point work in the ISC mode without mutual interference, and both have relatively high MAC efficiency.

Optionally, the STA may broadcast the ISC mode switching frame after determining that the second AP supports the ISC mode. The following uses an example in which the first AP accessed by the first STA works in a scheduling mode for description. The first STA sends an ISC mode request frame in an uplink timeslot. If the second AP supports the ISC mode, the second AP sends a response frame to the first STA after receiving the ISC mode request frame. The first STA broadcasts the ISC mode switching frame after receiving the response frame. In this way, the first AP and the second AP can switch to the ISC mode, so that the first AP and the second AP no longer interfere with each other, and both can work normally.

For example, in a procedure in which the AP switches from the scheduling mode to the ISC mode, a location of sending the ISC mode request frame is not generated by means of scheduling, but is preset. For example, the ISC mode request frame may be sent at an ending location of a timeslot. When the AP works in the scheduling mode, an interval needs to be reserved between timeslots for a purpose of channel detection or for sending a CTS-to-self (Clear to Send to Self) frame. The ISC mode request frame may be sent at the beginning of the interval. A sending manner of the ISC mode request frame may be that the STA broadcasts the frame on a working channel. The ISC mode request frame includes an identity of the first STA, such as a MAC address. In this way, after receiving the ISC mode request frame, the first AP or the second AP may send a response frame to the first STA according to the identity of the first STA. The location of sending the response frame is also preset, for example, may be the ending location of the timeslot. A method used by the first AP or the second AP to instruct all STAs in the coverage area to switch to the ISC mode may be adding indication information into a beacon frame or broadcasting ISC working mode switching control information on a specific control channel.

Optionally, in an embodiment, in step 330, when the working mode of the second access point is the non-coordinated scheduling mode, the first station broadcasts a contention mode switching frame, where the contention mode switching frame is used to instruct the second access point to switch to the contention mode.

In this way, both the first access point and the second access point work in the contention mode, such as a CSMA/CA mode or a contention mode that uses the RTS/CTS protocol to perform transmission protection, which further ensures that both the first access point and the second access point can work normally.

The foregoing describes in detail the methods according to embodiments of the present invention with reference to FIG. 1 to FIG. 3, and the following describes an access point and a station according to embodiments of the present invention with reference to FIG. 4 to FIG. 7.

FIG. 4 is a schematic block diagram of an access point 40 according to an embodiment of the present invention. The access point 40 in FIG. 4 includes a determining unit 410 and a switching unit 420. For example, the access point 40 may be an access point 110a or an access point 110b shown in FIG. 1.

The determining unit 410 is configured to determine a working mode of a second access point, where a coverage area of the access point overlaps a coverage area of the second access point, and the working mode includes one of a non-coordinated scheduling mode, a coordinated scheduling mode, a contention mode, and an in-slot contention ISC mode.

The switching unit 420 is configured to: when it is determined that the working mode of the second access point is the non-coordinated scheduling mode, initiate a working mode switching procedure, where the working mode switching procedure is used to switch the working mode of the second access point to the contention mode or the ISC mode.

In this embodiment of the present invention, an access point can detect a working mode of a neighboring access point whose coverage area overlaps a coverage area of the access point; when the working mode of the neighboring access point is a non-coordinated scheduling mode, a working mode switching procedure is initiated. In this way, mutual interference between non-coordinated access points with an overlapping coverage area can be reduced, which further ensures that each access point can work normally.

It should be understood that the non-coordinated scheduling mode indicates that the second access point works in a scheduling mode and cannot work collaboratively with a current working mode of the access point. The access point may uniformly allocate and schedule channel resources to implement the scheduling mode. For example, when the access point works in the contention mode or the ISC mode, it is determined that the working mode of the second access point is the non-coordinated scheduling mode regardless of a scheduling mode in which the second access point works; when the access point works in a scheduling mode and the second access point also works in a scheduling mode, the working mode of the second access point is determined as the non-coordinated scheduling mode only in a case in which the second access point cannot work collaboratively with the access point.

The coordinated scheduling mode indicates that the second access point works in the scheduling mode and can work collaboratively with the current working mode of the access point 40. For example, both the second access point and the first access point work in the scheduling mode and can work collaboratively with each other, and in this case, the first access point can determine that the second access point works in the coordinated scheduling mode.

The contention mode indicates that the second access point and a station that accesses the second access point acquire a transmit opportunity in a contention manner, such as a CDMA/CA mode or a contention mode that uses the RTS/CTS protocol to perform transmission protection.

The ISC mode is a mode that combines scheduling and contention. First, the second access point performs pre-scheduling on data transmission, and then a device scheduled for data transmission performs channel contention according to scheduling information. When the channel contention succeeds, the scheduling information takes effect; when the channel contention fails, the scheduling information is invalid.

Optionally, in an embodiment, the determining unit 410 is configured to determine the working mode of the second access point according to working mode information received from the second access point, where the working mode information includes an identity and a working mode identifier that are of the second access point.

Optionally, in another embodiment, the determining unit 410 is configured to determine the working mode of the second access point according to sense information received from a station that accesses the access point, where the sense information is determined according to a sensed information frame by the station that accesses the access point, the information frame is sent by the second access point or a station that accesses the second access point, and the information frame includes a working mode identifier of the second access point.

Optionally, in another embodiment, the determining unit 410 is configured to: when a quantity of stations that access the access point is less than a first threshold, determine a packet loss rate of sending a packet in a preset time period; and when the packet loss rate is greater than a second threshold, determine that the working mode of the second access point is the non-coordinated scheduling mode.

Optionally, in another embodiment, the determining unit 410 is configured to: when a quantity of stations that access the access point is greater than a third threshold, determine a packet loss rate of sending, in a preset time period, a packet to each station that accesses the access point; and when a quantity of stations whose packet loss rate is greater than a fourth threshold is greater than a fifth threshold, determine that the working mode of the second access point is the non-coordinated scheduling mode.

Optionally, in another embodiment, the determining unit 410 is configured to: when a quantity of times for which a station scheduled by the access point or the access point cannot send data in a preset time period is greater than a sixth threshold, or when a ratio of the quantity of times to a total quantity of times of sending data is greater than a seventh threshold, determine that the working mode of the second access point is the non-coordinated scheduling mode.

Optionally, in another embodiment, the determining unit 410 is configured to: when a working mode of the access point is the contention mode or the ISC mode and a contention success rate of the access point or a station that accesses the access point is lower than an eighth threshold, determine that the working mode of the second access point is the non-coordinated scheduling mode.

Optionally, in another embodiment, the determining unit 410 is configured to: when it is sensed in a preset time period that a quantity of times for which a packet sent by the second access point or a station that accesses the second access point is a packet sent in the contention mode is greater than a ninth threshold, determine that the working mode of the second access point is the contention mode.

Optionally, in another embodiment, the switching unit 420 is configured to broadcast an ISC mode switching frame, where the ISC mode switching frame is used to instruct the second access point to switch to the ISC mode.

In this way, interference caused by the second access point to the access point 40 can be reduced, and the second access point has relatively high MAC efficiency.

It should be understood that at the same time when the second access point is instructed to switch to the ISC mode, the access point 40 may also switch to the ISC mode. In this way, both the access point 40 and the second access point work in the ISC mode without mutual interference, and both have relatively high MAC efficiency.

Optionally, in another embodiment, the determining unit 410 is further configured to: broadcast an ISC mode request frame, where the ISC mode request frame is used to determine whether the second access point supports the ISC mode; and when a response frame that is sent, in response to the ISC mode request frame, by the second access point and/or the station that accesses the second access point is received, determine that the second access point supports the ISC mode. In this case, the switching unit 420 is configured to: when it is determined that the second access point supports the ISC mode, broadcast the ISC mode switching frame. In this way, performance of mode switching can be improved.

Optionally, in another embodiment, the switching unit 420 is configured to: when the working mode of the access point is the contention mode, broadcast a contention mode switching frame, where the contention mode switching frame is used to instruct the second access point to switch to the contention mode.

In this way, both the access point 40 and the second AP work in the contention mode, such as a CSMA/CA mode or a contention mode that uses the RTS/CTS protocol to perform transmission protection, which further ensures that both the access point 40 and the second AP can work normally.

Optionally, in another embodiment, the switching unit 420 is further configured to: when the working mode of the second access point is the contention mode and the working mode of the access point is the non-coordinated scheduling mode or the ISC mode, switch the access point to the contention mode.

Optionally, in another embodiment, the switching unit 420 is further configured to: when the access point determines that there is no second access point whose coverage area overlaps the coverage area of the access point and that works in the non-coordinated scheduling mode, broadcast a coordinated scheduling mode switching frame, so that an access point that receives the coordinated scheduling mode switching frame switches to the coordinated scheduling mode.

In this way, when there is no second access point that is around the access point 40 and that works in the non-coordinated scheduling mode, the access point 40 and the access point that receives the coordinated scheduling mode switching frame may be restored to the coordinated scheduling mode and work in the scheduling mode, which further improves MAC efficiency.

Optionally, in another embodiment, the determining unit 410 is further configured to: broadcast a mode probe frame, where the mode probe frame is used to determine whether there is an access point that works in the non-coordinated scheduling mode; and when no response frame in response to the mode probe frame is received in a preset time period, determine that there is no access point that works in the non-coordinated scheduling mode. In this case, the switching unit 420 is configured to: when it is determined that there is no access point that works in the non-coordinated scheduling mode, broadcast the coordinated scheduling mode switching frame.

In this way, when it is determined that there is no access point that is around the access point 40 and that works in the non-coordinated scheduling mode, the access point 40 switches to the coordinated scheduling mode, which can prevent misoperation, thereby improving switching efficiency. The access point 40 and the access point that receives the coordinated scheduling mode switching frame switch to the coordinated scheduling mode and work in the scheduling mode, which further improves the MAC efficiency.

The access point 40 according to this embodiment of the present invention may be corresponding to a method 200 according to an embodiment of the present invention, and the foregoing operations and/or functions of modules in the access point 40 are separately intended to implement a corresponding procedure of the method 200 in FIG. 2. For brevity, details are not described herein.

FIG. 5 is a schematic block diagram of a station 50 according to an embodiment of the present invention. The station 50 in FIG. 5 includes a sensing unit 510, a determining unit 520, and a switching unit 530. For example, the station 50 may be a station 120a or a station 120b shown in FIG. 1.

The sensing unit 510 is configured to sense an information frame sent by a second access point and/or a second station that accesses the second access point.

The determining unit 520 is configured to determine a working mode of the second access point according to the information frame, where the working mode includes one of a non-coordinated scheduling mode, a coordinated scheduling mode, a contention mode, and an in-slot contention ISC mode.

The switching unit 530 is configured to: when it is determined that the working mode of the second access point is the non-coordinated scheduling mode, initiate a working mode switching procedure, where the working mode switching procedure is used to switch the working mode of the second access point to the contention mode or the ISC mode.

In this embodiment of the present invention, a station detects a working mode of a neighboring access point around the station; when the working mode of the neighboring access point is a non-coordinated scheduling mode, a working mode switching procedure is initiated. In this way, mutual interference between non-coordinated access points with an overlapping coverage area can be reduced, which further ensures that each access point can work normally.

It should be understood that the non-coordinated scheduling mode indicates that the second access point works in a scheduling mode and cannot work collaboratively with a current working mode of a first access point. The access point may uniformly allocate and schedule channel resources to implement the scheduling mode. For example, when the first access point works in the contention mode or the ISC mode, it is determined that the working mode of the second access point is the non-coordinated scheduling mode regardless of a scheduling mode in which the second access point works; when the first access point works in a scheduling mode and the second access point also works in a scheduling mode, the working mode of the second access point is determined as the non-coordinated scheduling mode only in a case in which the second access point cannot work collaboratively with the first access point.

The coordinated scheduling mode indicates that the second access point works in the scheduling mode and can work collaboratively with the current working mode of the first access point. For example, both the second access point and the first access point work in the scheduling mode and can work collaboratively with each other, and in this case, the first access point can determine that the second access point works in the coordinated scheduling mode.

The contention mode indicates that the second access point and a station that accesses the second access point acquire a transmit opportunity in a contention manner, such as a CDMA/CA mode or a contention mode that uses the RTS/CTS protocol to perform transmission protection.

The ISC mode is a mode that combines scheduling and contention. First, the second access point performs pre-scheduling on data transmission, and then a device scheduled for data transmission performs channel contention according to scheduling information. When the channel contention succeeds, the scheduling information takes effect; when the channel contention fails, the scheduling information is invalid.

Optionally, in an embodiment, the switching unit 530 is configured to broadcast an ISC mode switching frame, where the ISC mode switching frame is used to instruct the second access point to switch to the ISC mode.

In this way, mutual interference between the first access point and the second access point can be reduced, and both have relatively high MAC efficiency.

Optionally, in another embodiment, the switching unit 530 is configured to broadcast a contention mode switching frame, where the contention mode switching frame is used to instruct the second access point to switch to the contention mode.

In this way, both the first AP and the second AP work in the contention mode, such as a CSMA/CA mode or a contention mode that uses the RTS/CTS protocol to perform transmission protection, which further ensures that both the first AP and the second AP can work normally.

The station 50 according to this embodiment of the present invention may be corresponding to a method 300 according to an embodiment of the present invention, and the foregoing operations and/or functions of modules in the station 50 are separately intended to implement a corresponding procedure of the method 300 in FIG. 3. For brevity, details are not described herein.

Figure 6:
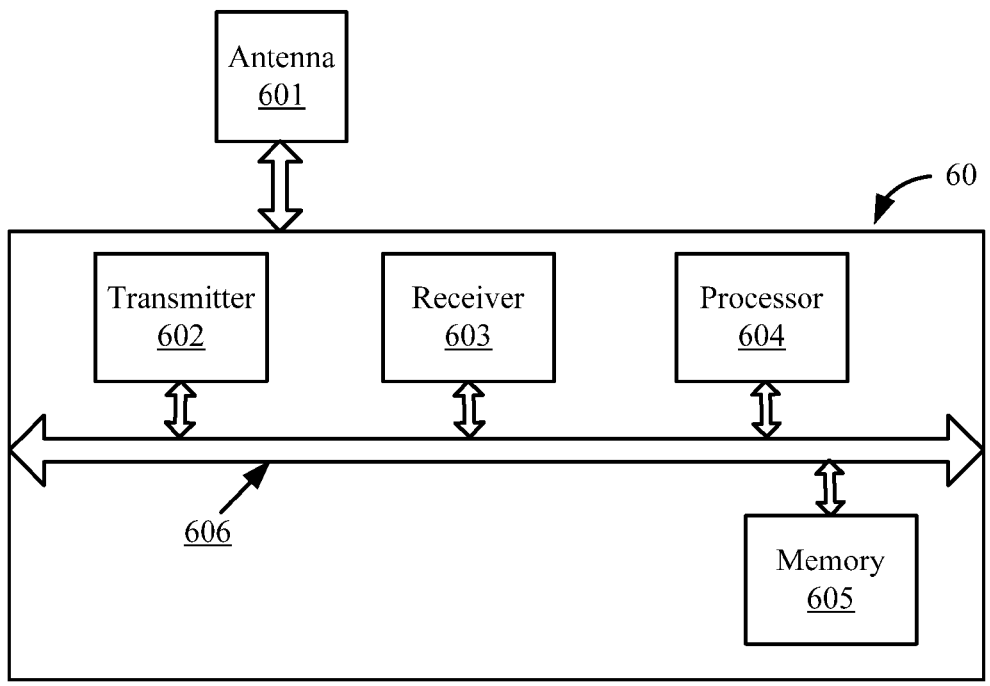
FIG. 6 is a schematic block diagram of an access point according to another embodiment of the present invention.

FIG. 6 is a schematic block diagram of an access point 60 according to another embodiment of the present invention.

The access point 60 in FIG. 6 may be configured to implement steps and methods in the foregoing method embodiments. In the embodiment in FIG. 6, the access point 60 includes an antenna 601, a transmitter 602, a receiver 603, a processor 604, and a memory 605. The processor 604 controls an operation of the access point 60, and may be configured to process a signal. The memory 605 may include a read-only memory and a random access memory, and provides an instruction and data to the processor 604. The transmitter 602 and the receiver 603 may be coupled to the antenna 601. All components of the access point 60 are coupled together by using a bus system 606, where the bus system 606 includes a power bus, a control bus, and a state signal bus in addition to a data bus. However, for clarity, various types of buses in the figure are marked as the bus system 606. For example, the access point 60 may be an access point 110a or an access point 110b shown in FIG. 1.

The memory 605 may store an instruction for executing the following process:

The processor 604 determines a working mode of a second access point, where a coverage area of the access point 60 overlaps a coverage area of the second access point, and the working mode includes one of a non-coordinated scheduling mode, a coordinated scheduling mode, a contention mode, and an in-slot contention ISC mode; and when it is determined that the working mode of the second access point is the non-coordinated scheduling mode, the processor 604 initiates a working mode switching procedure, where the working mode switching procedure is used to switch the working mode of the second access point to the contention mode or the ISC mode.

In this embodiment of the present invention, an access point can detect a working mode of a neighboring access point whose coverage area overlaps a coverage area of the access point; when the working mode of the neighboring access point is a non-coordinated scheduling mode, a working mode switching procedure is initiated. In this way, mutual interference between non-coordinated access points with an overlapping coverage area can be reduced, which further ensures that each access point can work normally.

It should be understood that the non-coordinated scheduling mode indicates that the second access point works in a scheduling mode and cannot work collaboratively with a current working mode of the access point 60. The access point may uniformly allocate and schedule channel resources to implement the scheduling mode. For example, when the access point 60 works in the contention mode or the ISC mode, it is determined that the working mode of the second access point is the non-coordinated scheduling mode regardless of a scheduling mode in which the second access point works; when the access point 60 works in a scheduling mode and the second access point also works in a scheduling mode, the working mode of the second access point is determined as the non-coordinated scheduling mode only in a case in which the second access point cannot work collaboratively with the access point 60.

The coordinated scheduling mode indicates that the second access point works in the scheduling mode and can work collaboratively with the current working mode of the access point 60. For example, both the second access point and the access point 60 work in the scheduling mode and can work collaboratively with each other, and in this case, the access point 60 can determine that the second access point works in the coordinated scheduling mode.

The contention mode indicates that the second access point and a station that accesses the second access point acquire a transmit opportunity in a contention manner, such as a CDMA/CA mode or a contention mode that uses the RTS/CTS protocol to perform transmission protection.

The ISC mode is a mode that combines scheduling and contention. First, the second access point performs pre-scheduling for data transmission, and then a device scheduled for data transmission performs channel contention according to scheduling information. When the channel contention succeeds, the scheduling information takes effect; when the channel contention fails, the scheduling information is invalid.

Optionally, in an embodiment, the memory 605 may further store an instruction for executing the following process:

The processor 604 determines the working mode of the second access point according to working mode information received by the receiver 603 from the second access point, where the working mode information includes an identity and a working mode identifier that are of the second access point.

Optionally, in another embodiment, the memory 605 may further store an instruction for executing the following process:

The processor 604 determines the working mode of the second access point according to sense information received by the receiver 603 from a station that accesses the access point 60, where the sense information is determined according to a sensed information frame by the station that accesses the access point, the information frame is sent by the second access point or a station that accesses the second access point, and the information frame includes a working mode identifier of the second access point.

Optionally, in another embodiment, the memory 605 may further store an instruction for executing the following process:

When a quantity of stations that access the access point is less than a first threshold, the processor 604 determines a packet loss rate of sending a packet in a preset time period; and when the packet loss rate is greater than a second threshold, the processor 604 determines that the working mode of the second access point is the non-coordinated scheduling mode.

Optionally, in another embodiment, the memory 605 may further store an instruction for executing the following process:

When a quantity of stations that access the access point is greater than a third threshold, the processor 604 determines a packet loss rate of sending, in a preset time period, a packet to each station that accesses the access point; and when a quantity of stations whose packet loss rate is greater than a fourth threshold is greater than a fifth threshold, the processor 604 determines that the working mode of the second access point is the non-coordinated scheduling mode.

Optionally, in another embodiment, the memory 605 may further store an instruction for executing the following process:

When a quantity of times for which a station scheduled by the access point or the access point cannot send data in a preset time period is greater than a sixth threshold, or when a ratio of the quantity of times to a total quantity of times of sending data is greater than a seventh threshold, the processor 604 determines that the working mode of the second access point is the non-coordinated scheduling mode.

Optionally, in another embodiment, the memory 605 may further store an instruction for executing the following process:

When a working mode of the access point is the contention mode or the ISC mode and a contention success rate of the access point 60 or a station that accesses the access point is lower than an eighth threshold, the processor 604 determines that the working mode of the second access point is the non-coordinated scheduling mode.

Optionally, in another embodiment, the memory 605 may further store an instruction for executing the following process:

When the access point senses in a preset time period that a quantity of times for which a packet sent by the second access point or a station that accesses the second access point is a packet sent in the contention mode is greater than a ninth threshold, the processor 604 determines that the working mode of the second access point is the contention mode.

Optionally, in another embodiment, the memory 605 may further store an instruction for executing the following process:

The transmitter 602 broadcasts an ISC mode switching frame, where the ISC mode switching frame is used to instruct the second access point to switch to the ISC mode.

In this way, interference caused by the second access point to the access point 60 can be reduced, and the second access point has relatively high MAC efficiency.

It should be understood that at the same time when the second access point is instructed to switch to the ISC mode, the memory 605 may further store an instruction that enables the processor 604 to switch the access point 60 to the ISC mode. In this way, both the access point 60 and the second access point work in the ISC mode without mutual interference, and both have relatively high MAC efficiency.

Optionally, in another embodiment, the memory 605 may further store an instruction for executing the following process:

The transmitter 602 broadcasts an ISC mode request frame, where the ISC mode request frame is used to determine whether the second access point supports the ISC mode; and when the receiver 603 receives a response frame that is sent, in response to the ISC mode request frame, by the second access point and/or the station that accesses the second access point, the processor 604 determines that the second access point supports the ISC mode. In this case, the transmitter 602 broadcasts the ISC mode switching frame when it is determined that the second access point supports the ISC mode.

In this way, performance of mode switching can be improved.

Optionally, in another embodiment, the memory 605 may further store an instruction for executing the following process:

When the working mode of the access point is the contention mode, the transmitter 602 broadcasts a contention mode switching frame, where the contention mode switching frame is used to instruct the second access point to switch to the contention mode.

Optionally, in another embodiment, the memory 605 may further store an instruction for executing the following process:

The processor 604 switches the access point 60 to the contention mode when the working mode of the second access point is the contention mode and the working mode of the access point is the non-coordinated scheduling mode or the ISC mode.

In this way, both the access point 60 and the second access point work in the contention mode, such as a CSMA/CA mode or a contention mode that uses the RTS/CTS protocol to perform transmission protection, which further ensures that both the access point 60 and the second access point can work normally.

Optionally, in another embodiment, the memory 605 may further store an instruction for executing the following process:

When the processor 604 determines that there is no second access point that works in the non-coordinated scheduling mode and whose coverage area overlaps the coverage area of the access point 60, the transmitter 602 broadcasts a coordinated scheduling mode switching frame, so that an access point that receives the coordinated scheduling mode switching frame switches to the coordinated scheduling mode.

In this way, when there is no second access point that works in the non-coordinated scheduling mode and that is around the access point 60, the access point 60 and the access point that receives the coordinated scheduling mode switching frame may be restored to the coordinated scheduling mode and work in the scheduling mode, which further improves MAC efficiency.

Optionally, in another embodiment, the memory 605 may further store an instruction for executing the following process:

The transmitter 602 broadcasts a mode probe frame, where the mode probe frame is used to determine whether there is an access point that works in the non-coordinated scheduling mode; and when the receiver 603 receives no response frame in response to the mode probe frame in a preset time period, the processor 604 determines that there is no access point that works in the non-coordinated scheduling mode. In this case, the transmitter 602 broadcasts the coordinated scheduling mode switching frame when it is determined that there is no access point that works in the non-coordinated scheduling mode.

In this way, when it is determined that there is no access point that is around the access point 60 and that works in the non-coordinated scheduling mode, the access point 60 switches to the coordinated scheduling mode, which can prevent misoperation, thereby improving switching efficiency. The access point 60 and the access point that receives the coordinated scheduling mode switching frame switch to the coordinated scheduling mode and work in the scheduling mode, which further improves the MAC efficiency.

Figure 7:
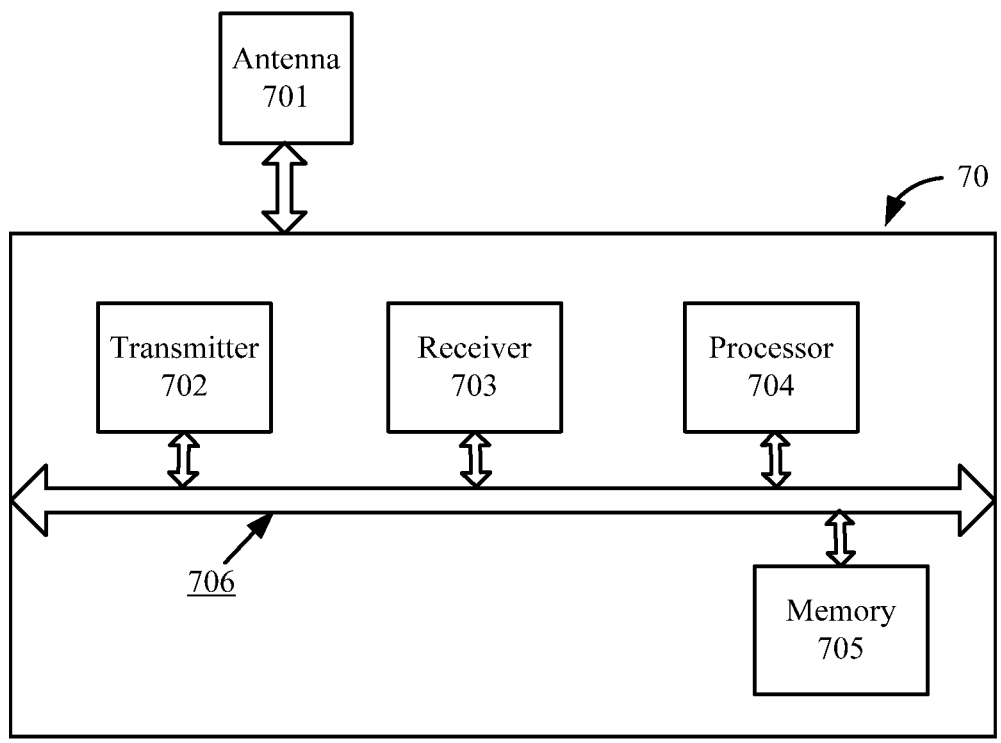
FIG. 7 is a schematic block diagram of a station according to another embodiment of the present invention.

FIG. 7 is a schematic block diagram of a station 70 according to another embodiment of the present invention.

The station 70 in FIG. 7 may be configured to implement steps and methods in the foregoing method embodiments. In the embodiment in FIG. 7, the station 70 includes an antenna 701, a transmitter 702, a receiver 703, a processor 704, and a memory 705. The processor 704 controls an operation of the access point 70, and may be configured to process a signal. The memory 705 may include a read-only memory and a random access memory, and provides an instruction and data to the processor 704. The transmitter 702 and the receiver 703 may be coupled to the antenna 701. All components of the access point 70 are coupled together by using a bus system 706, where the bus system 706 includes a power bus, a control bus, and a state signal bus in addition to a data bus. However, for clarity, various types of buses in the figure are marked as the bus system 706. For example, the station 70 may be a station 120a or a station 120b shown in FIG. 1.

The memory 705 may store an instruction for executing the following process:

The processor 704 senses an information frame sent by a second access point and/or a second station that accesses the second access point; the processor 704 determines a working mode of the second access point according to the information frame, where the working mode includes one of a non-coordinated scheduling mode, a coordinated scheduling mode, a contention mode, and an in-slot contention ISC mode; and when it is determined that the working mode of the second access point is the non-coordinated scheduling mode, the processor 704 initiates a working mode switching procedure, where the working mode switching procedure is used to switch the working mode of the second access point to the contention mode or the ISC mode.

In this embodiment of the present invention, a station detects a working mode of a neighboring access point around the station; when the working mode of the neighboring access point is a non-coordinated scheduling mode, a working mode switching procedure is initiated. In this way, mutual interference between non-coordinated access points with an overlapping coverage area can be reduced, which further ensures that each access point can work normally.

It should be understood that the non-coordinated scheduling mode indicates that the second access point works in a scheduling mode and cannot work collaboratively with a current working mode of a first access point. The access point may uniformly allocate and schedule channel resources to implement the scheduling mode. For example, when the first access point works in the contention mode or the ISC mode, it is determined that the working mode of the second access point is the non-coordinated scheduling mode regardless of a scheduling mode in which the second access point works; when the first access point works in a scheduling mode and the second access point also works in a scheduling mode, the working mode of the second access point is determined as the non-coordinated scheduling mode only in a case in which the second access point cannot work collaboratively with the first access point.

The coordinated scheduling mode indicates that the second access point works in the scheduling mode and can work collaboratively with the current working mode of the first access point. For example, both the second access point and the first access point work in the scheduling mode and can work collaboratively with each other, and in this case, the first access point can determine that the second access point works in the coordinated scheduling mode.

The contention mode indicates that the second access point and a station that accesses the second access point acquire a transmit opportunity in a contention manner, such as a CDMA/CA mode or a contention mode that uses the RTS/CTS protocol to perform transmission protection.

The ISC mode is a mode that combines scheduling and contention. First, the second access point performs pre-scheduling on data transmission, and then a device scheduled for data transmission performs channel contention according to scheduling information. When the channel contention succeeds, the scheduling information takes effect; when the channel contention fails, the scheduling information is invalid.

Optionally, in an embodiment, the memory 705 may further store an instruction for executing the following process:

The transmitter 702 broadcasts an ISC mode switching frame, where the ISC mode switching frame is used to instruct the second access point to switch to the ISC mode.

In this way, interference caused by the second access point to the first access point can be reduced, and the second access point has relatively high MAC efficiency.

It should be understood that at the same time when the second access point is instructed to switch to the ISC mode, the memory 705 may further store an instruction that enables the processor 704 to switch the first access point to the ISC mode. In this way, both the first access point and the second access point work in the ISC mode without mutual interference, and both have relatively high MAC efficiency.

Optionally, in an embodiment, the memory 705 may further store an instruction for executing the following process:

The transmitter 702 broadcasts a contention mode switching frame, where the contention mode switching frame is used to instruct the second access point to switch to the contention mode.

In this way, both the first access point and the second access point work in the contention mode, such as a CSMA/CA mode or a contention mode that uses the RTS/CTS protocol to perform transmission protection, which further ensures that both the first access point and the second access point can work normally.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   determining, by a first access point, a working mode of a second access point, wherein a coverage area of the first access point overlaps a coverage area of the second access point, and wherein the working mode comprises a non-coordinated scheduling mode, a coordinated scheduling mode, a contention mode, or an in-slot contention (ISC) mode; and
   when it is determined that the working mode of the second access point is the non-coordinated scheduling mode, initiating, by the first access point, a working mode switching procedure, wherein the working mode switching procedure is used to switch the working mode of the second access point to the contention mode or the ISC mode.

2. The method according to claim 1, wherein the determining, by a first access point, a working mode of a second access point comprises at least one of:
   determining, by the first access point, the working mode of the second access point according to working mode information received from the second access point, wherein the working mode information comprises an identity and a working mode identifier that are of the second access point;
   determining, by the first access point, the working mode of the second access point according to sense information received from a station that accesses the first access point, wherein the sense information is determined according to a sensed information frame by the station that accesses the first access point, wherein the information frame is sent by the second access point or a station that accesses the second access point, and wherein the information frame comprises a working mode identifier of the second access point;
   when a quantity of stations that access the first access point is less than a first threshold, determining, by the first access point, a packet loss rate of sending a packet in a preset time period, wherein when the packet loss rate is greater than a second threshold, the first access point determines that the working mode of the second access point is the non-coordinated scheduling mode;
   when a quantity of stations that access the first access point is greater than a third threshold, determining, by the first access point, a packet loss rate of sending, in a preset time period, a packet to each station that accesses the first access point, wherein when a quantity of stations whose packet loss rate is greater than a fourth threshold is greater than a fifth threshold, the first access point determines that the working mode of the second access point is the non-coordinated scheduling mode;

when a quantity of times for which a station scheduled by the first access point or the first access point cannot send data in a preset time period is greater than a sixth threshold, or when a ratio of the quantity of times to a total quantity of times of sending data is greater than a seventh threshold, the first access point determines that the working mode of the second access point is the non-coordinated scheduling mode;

when a working mode of the first access point is the contention mode or the ISC mode and a contention success rate of the first access point or a station that accesses the first access point is lower than an eighth threshold, the first access point determines that the working mode of the second access point is the non-coordinated scheduling mode; or when the first access point senses in a preset time period that a quantity of times for which a packet sent by the second access point or a station that accesses the second access point is a packet sent in the contention mode is greater than a ninth threshold, the first access point determines that the working mode of the second access point is the contention mode.

3. The method according to claim 1, wherein the initiating, by the first access point, a working mode switching procedure comprises:

broadcasting, by the first access point, an ISC mode switching frame, wherein the ISC mode switching frame is used to instruct the second access point to switch to the ISC mode.

4. The method according to claim 3, further comprising:

broadcasting, by the first access point, an ISC mode request frame, wherein the ISC mode request frame is used to determine whether the second access point supports the ISC mode; and determining that the second access point supports the ISC mode when the first access point receives a response frame that is sent, in response to the ISC mode request frame, by at least one of the second access point or the station that accesses the second access point, wherein the broadcasting, by the first access point, the ISC mode switching frame occurs in response to a determination that the second access point supports the ISC mode.

5. The method according to claim 1, wherein the initiating, by the first access point, a working mode switching procedure comprises:

when the working mode of the first access point is the contention mode, broadcasting, by the first access point, a contention mode switching frame, wherein the contention mode switching frame is used to instruct the second access point to switch to the contention mode.

6. The method according to claim 1, further comprising:

when the working mode of the second access point is the contention mode and the working mode of the first access point is the non-coordinated scheduling mode or the ISC mode, switching, by the first access point, to the contention mode.

7. The method according to claim 1, further comprising:

when the first access point determines that there is no second access point whose coverage area overlaps the coverage area of the first access point and that works in the non-coordinated scheduling mode, broadcasting, by the first access point, a coordinated scheduling mode switching frame, so that an access point that receives the coordinated scheduling mode switching frame switches to the coordinated scheduling mode.

8. The method according to claim 7, further comprising:

broadcasting, by the first access point, a mode probe frame, wherein the mode probe frame is used to determine whether there is an access point that works in the non-coordinated scheduling mode; and when no response frame in response to the mode probe frame is received in a preset time period, determining, by the first access point, that there is no access point that works in the non-coordinated scheduling mode, wherein the broadcasting, by the first access point, the coordinated scheduling mode switching frame occurs in response to a determination that there is no access point that works in the non-coordinated scheduling mode.

9. A method, comprising:

sensing, by a first station that accesses a first access point, an information frame sent by at least one of a second access point or a second station that accesses the second access point;

determining, by the first station, a working mode of the second access point according to the information frame, wherein the working mode comprises a non-coordinated scheduling mode, a coordinated scheduling mode, a contention mode, or an in-slot contention (ISC) mode; and when it is determined that the working mode of the second access point is the non-coordinated scheduling mode, initiating, by the first station, a working mode switching procedure, wherein the working mode switching procedure is used to switch the working mode of the second access point to the contention mode or the ISC mode.

10. The method according to claim 9, wherein the initiating, by the first station, a working mode switching procedure comprises at least one of:

broadcasting, by the first station, an ISC mode switching frame, wherein the ISC mode switching frame is used to instruct the second access point to switch to the ISC mode; or broadcasting, by the first station, a contention mode switching frame, wherein the contention mode switching frame is used to instruct the second access point to switch to the contention mode.

11. An access point, comprising:

a processor configured to determine a working mode of a second access point, wherein a coverage area of the access point overlaps a coverage area of the second access point, and the working mode comprises a non-coordinated scheduling mode, a coordinated scheduling mode, a contention mode, or an in-slot contention (ISC) mode; and a transmitter, configured to initiate a working mode switching procedure when it is determined that the working mode of the second access point is the non-coordinated scheduling mode, wherein the working mode switching procedure is used to switch the working mode of the second access point to the contention mode or the ISC mode.

12. The access point according to claim 11, wherein the processor is configured to perform at least one of:

determine the working mode of the second access point according to working mode information received from the second access point, wherein the working mode information comprises an identity and a working mode identifier that are of the second access point;

determine the working mode of the second access point according to sense information received from a station that accesses the access point, wherein the sense information is determined according to a sensed information frame by the station that accesses the access point, wherein the information frame is sent by the second access point or a station that accesses the second access point, and wherein the information frame comprises a working mode identifier of the second access point;

when a quantity of stations that access the access point is less than a first threshold, determine a packet loss rate of sending a packet in a preset time period, wherein when the packet loss rate is greater than a second threshold, the processor is further configured to determine that the working mode of the second access point is the non-coordinated scheduling mode;

when a quantity of stations that access the access point is greater than a third threshold, determine a packet loss rate of sending, in a preset time period, a packet to each station that accesses the access point, wherein when a quantity of stations whose packet loss rate is greater than a fourth threshold is greater than a fifth threshold, the processor is further configured to determine that the working mode of the second access point is the non-coordinated scheduling mode;

when a quantity of times for which a station scheduled by the access point or the access point cannot send data in a preset time period is greater than a sixth threshold, or when a ratio of the quantity of times to a total quantity of times of sending data is greater than a seventh threshold, determine that the working mode of the second access point is the non-coordinated scheduling mode;

when a working mode of the access point is the contention mode or the ISC mode and a contention success rate of the access point or a station that accesses the access point is lower than an eighth threshold, determine that the working mode of the second access point is the non-coordinated scheduling mode; or when it is sensed in a preset time period that a quantity of times for which a packet sent by the second access point or a station that accesses the second access point is a packet sent in the contention mode is greater than a ninth threshold, determine that the working mode of the second access point is the contention mode.

13. The access point according to claim 11, wherein the transmitter is configured to broadcast an ISC mode switching frame, and wherein the ISC mode switching frame is used to instruct the second access point to switch to the ISC mode.

14. The access point according to claim 13, wherein the transmitter is further configured to broadcast an ISC mode request frame, wherein the ISC mode request frame is used to determine whether the second access point supports the ISC mode, wherein the processor is further configured to determine that the second access point supports the ISC mode when a response frame that is sent, in response to the ISC mode request frame, by at least one of the second access point or the station that accesses the second access point is received, and wherein the transmitter is configured to broadcast the ISC mode switching frame when it is determined that the second access point supports the ISC mode.

15. The access point according to claim 11, wherein the transmitter is configured to broadcast a contention mode switching frame when the working mode of the access point is the contention mode, wherein the contention mode switching frame is used to instruct the second access point to switch to the contention mode.

16. The access point according to claim 11, wherein the transmitter is further configured to switch the access point to the contention mode when the working mode of the second access point is the contention mode and the working mode of the access point is the non-coordinated scheduling mode or the ISC mode.

17. The access point according to claim 11, wherein the transmitter is further configured to broadcast a coordinated scheduling mode switching frame, so that an access point that receives the coordinated scheduling mode switching frame switches to the coordinated scheduling mode, when the access point determines that there is no second access point whose coverage area overlaps the coverage area of the access point and that works in the non-coordinated scheduling mode.

18. The access point according to claim 17, wherein the transmitter is further configured to broadcast a mode probe frame, wherein the mode probe frame is used to determine whether there is an access point that works in the non-coordinated scheduling mode, wherein the processor is further configured to determine that there is no access point that works in the non-coordinated scheduling mode when no response frame in response to the mode probe frame is received in a preset time period, and wherein the transmitter is configured to broadcast the coordinated scheduling mode switching frame when it is determined that there is no access point that works in the non-coordinated scheduling mode.

19. A station, wherein the station accesses a first access point and comprises:

a receiver configured to sense an information frame sent by at least one of a second access point or a second station that accesses the second access point;

a processor configured to determine a working mode of the second access point according to the information frame, wherein the working mode comprises a non-coordinated scheduling mode, a coordinated scheduling mode, a contention mode, or an in-slot contention (ISC) mode; and a transmitter, configured to initiate a working mode switching procedure when it is determined that the working mode of the second access point is the non-coordinated scheduling mode, wherein the working mode switching procedure is used to switch the working mode of the second access point to the contention mode or the ISC mode.

20. The station according to claim 19, wherein the transmitter is configured to perform at least one of:

broadcast an ISC mode switching frame, wherein the ISC mode switching frame is used to instruct the second access point to switch to the ISC mode; or broadcast a contention mode switching frame, wherein the contention mode switching frame is used to instruct the second access point to switch to the contention mode.

* * * * *